United States Patent [19]

Mori

[11] Patent Number: 4,525,726

[45] Date of Patent: Jun. 25, 1985

[54] INTERPOLATION DOT CONTROL IN AN INK JET SYSTEM PRINTER

[75] Inventor: Yuichirou Mori, Yamatokoriyama, Japan

[73] Assignee: Sharp Kabushiki Kaisha, Osaka, Japan

[21] Appl. No.: 462,700

[22] Filed: Jan. 31, 1983

[30] Foreign Application Priority Data

Feb. 10, 1982 [JP] Japan ................................ 57-20322

[51] Int. Cl.[3] ........................................... G01D 15/18

[52] U.S. Cl. ....................................... 346/75; 346/1.1

[58] Field of Search .................... 346/75, 1.1; 400/126

[56] References Cited

U.S. PATENT DOCUMENTS 3,878,517 4/1975 Kasubuchi ........................... 346/75

4,115,787 9/1978 Fujimoto .............................. 346/75

4,216,480 8/1980 Buehner .............................. 346/75

4,371,878 2/1983 Jinnai ................................... 346/75

*Primary Examiner*—Joseph W. Hartary

*Attorney, Agent, or Firm*—Birch, Stewart, Kolasch & Birch

[57] ABSTRACT

An ink jet system printer of the charge amplitude controlling type includes a print control system for emitting printing ink droplets provided for forming a matrix pattern and interpolation ink droplets interposed among the printing ink droplets at a ratio, for example, 1/20. A counting system is provided for counting the number of printing ink droplets while a printer head travels a predetermined length. The counted number is compared with a reference number. In response to the comparison result, the interpolation dot ratio is varied in order to compensate for the variation of the travelling speed of the printer head.

7 Claims, 5 Drawing Figures

FIG. 3 (PRINT CONTROL -44-)

INTERPOLATION DOT CONTROL IN AN INK JET SYSTEM PRINTER

BACKGROUND AND SUMMARY OF THE INVENTION

The present invention relates to an ink jet system printer of the charge amplitude controlling type and, more particularly, to an interpolation dot control system in an ink jet system printer.

Generally, an ink jet system printer of the charge amplitude controlling type includes a carriage which is driven to travel in front of a record receiving paper in the lateral direction. The carriage carries a printer head including a nozzle and a charging tunnel. An electromechanical transducer is attached to the nozzle for issuing ink droplets at a given frequency. A charging operation is conducted by the charging tunnel in accordance with the print information to charge the ink droplet to a desired level. A pair of deflection electrodes are mounted on the carriage for deflecting the charged ink droplets in the vertical direction, thereby printing desired symbols on the record receiving paper in a dot matrix fashion. Ink droplets not contributing to the actual printing operation are neither charged nor deflected, and collected by a beam gutter disposed between the deflection electrodes and the record receiving paper.

In such an ink jet system printer of the charge amplitude controlling type, the printing quality is greatly influenced by the speed of the travelling carriage because the lateral position in the dot matrix pattern is determined by the location of the travelling carriage. However, it is difficult to strictly control the speed of the travelling carriage over one line of the printing operation to render this speed uniform. The speed of the travelling carriage normally varies during the one line printing due to, for example, the drift phenomenon. The variation of the speed of the travelling carriage appears in the printed pattern as a variation in the width of, for example, the printed characters.

Accordingly, an object of the present invention is to provide a print control system in an ink jet system printer of the charge amplitude controlling type, which ensures stable printing operation even when the speed of the travelling carriage varies during one line of the printing operation.

Another object of the present invention is to provide an interpolation dot control system which functions to compensate for the variation in the speed of the travelling carriage.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a detection system is provided for detecting the location of the travelling carriage. The detection system develops a timing signal when, for example, the travelling carriage reaches the respective character print position. A counter system is provided for counting the number of ink droplets developed between the adjacent two timing signals. The thus obtained count information is compared with a reference number, and the ratio of the actually applied number of ink droplets to the reference number (the so-called interpolation dot ratio) is determined in response to the comparison result. More specifically, when the count number of the ink droplets is greater than the reference number, this indicating the fact that the speed of the travelling carriage is lower than a desired level, the number of the interpolation dots is increased to prevent the character width from being narrowed. In such an ink jet system printer, the first dot position of the individual character is determined by the timing signal developed from the carriage position detection system.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
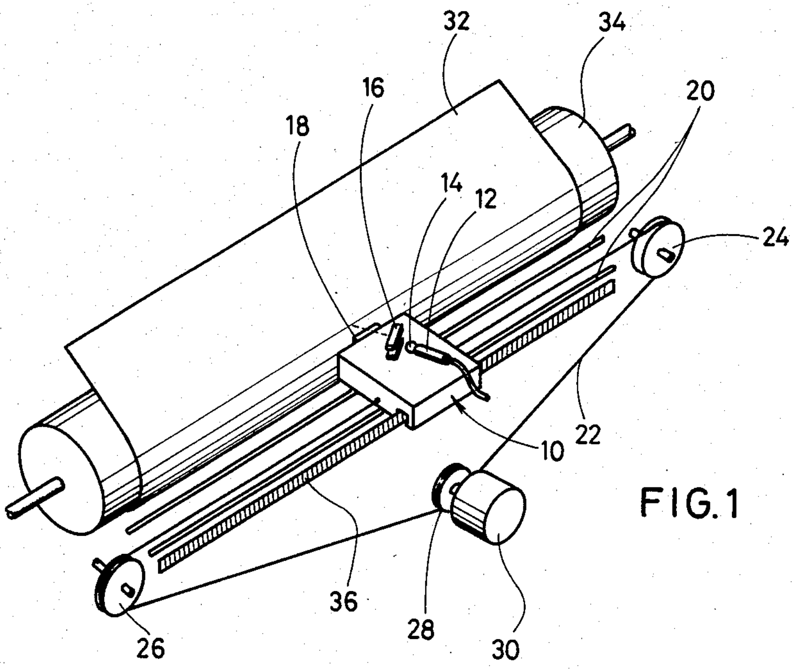
FIG. 1 is a schematic perspective view of an embodiment of an ink jet system printer of the charge amplitude controlling type of the present invention.
Figure 2:
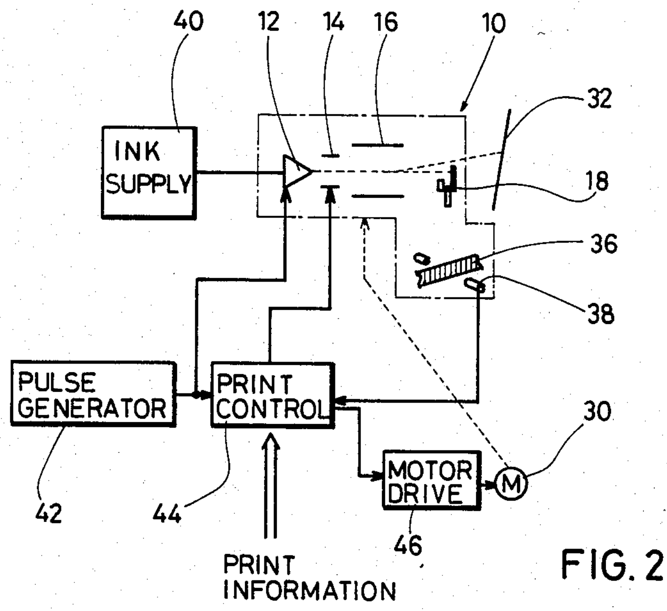
FIG. 2 is a schematic block diagram of a control circuit included in the ink jet system printer of FIG. 1.

An ink jet system printer of the charge amplitude controlling type generally includes a carriage 10 for supporting a printer head having a nozzle 12 and a charging tunnel 14, a pair of deflection electrodes 16, and a beam gutter 18. The carriage 10 is slidably mounted on a pair of shafts 20, and the carriage 10 is driven to travel in the lateral direction along the shafts 20. More specifically, the carriage 10 is fixed to a wire 22 which is extended among pulleys 24, 26, and 28. The pulley 28 is connected to a drive motor 30 for shifting the carriage 10 along the shafts 20. A record receiving paper 32 is supported by a platen 34, and is located in front of the carriage 10. A slit plate 36 is disposed along the shafts 20 for developing a timing signal when the carriage 10 reaches the individual character print position. More specifically, the slit plate 36 is provided with a plurality of slits which are formed at the respective character print positions. An optical detection system 38 (see FIG. 2) is mounted on the carriage 10 in order to develop the timing signal when the optical detection system 38 detects one of the slits formed in the slit plate 36.

An ink liquid supply system 40 is connected to the nozzle 12 for supplying the ink liquid of a predetermined pressure to the nozzle 12. An electro-mechanical transducer (not shown) is attached to the nozzle 12 for developing ink droplets at a given frequency. More specifically, a pulse signal of a predetermined frequency is applied from a pulse generator 42 to the electromechanical transducer to vibrate the nozzle 12, thereby emitting the ink droplets from the nozzle 12 at the predetermined frequency. The pulse signal developed from the pulse generator 42 is further applied to a print control circuit 44 which receives, in addition to the pulse signal, the timing signal developed from the optical detection system 38 and a print information signal such as a coded character data. In response to those three signals, the print control circuit 44 develops a charging signal to the charging tunnel 14 in order to selectively charge the ink droplets emitted from the nozzle 12 in accordance with the print information. The print control circuit 44 further develops a motor control signal to a motor drive circuit 46 for controlling the rotation of the motor 30.

Figure 3:
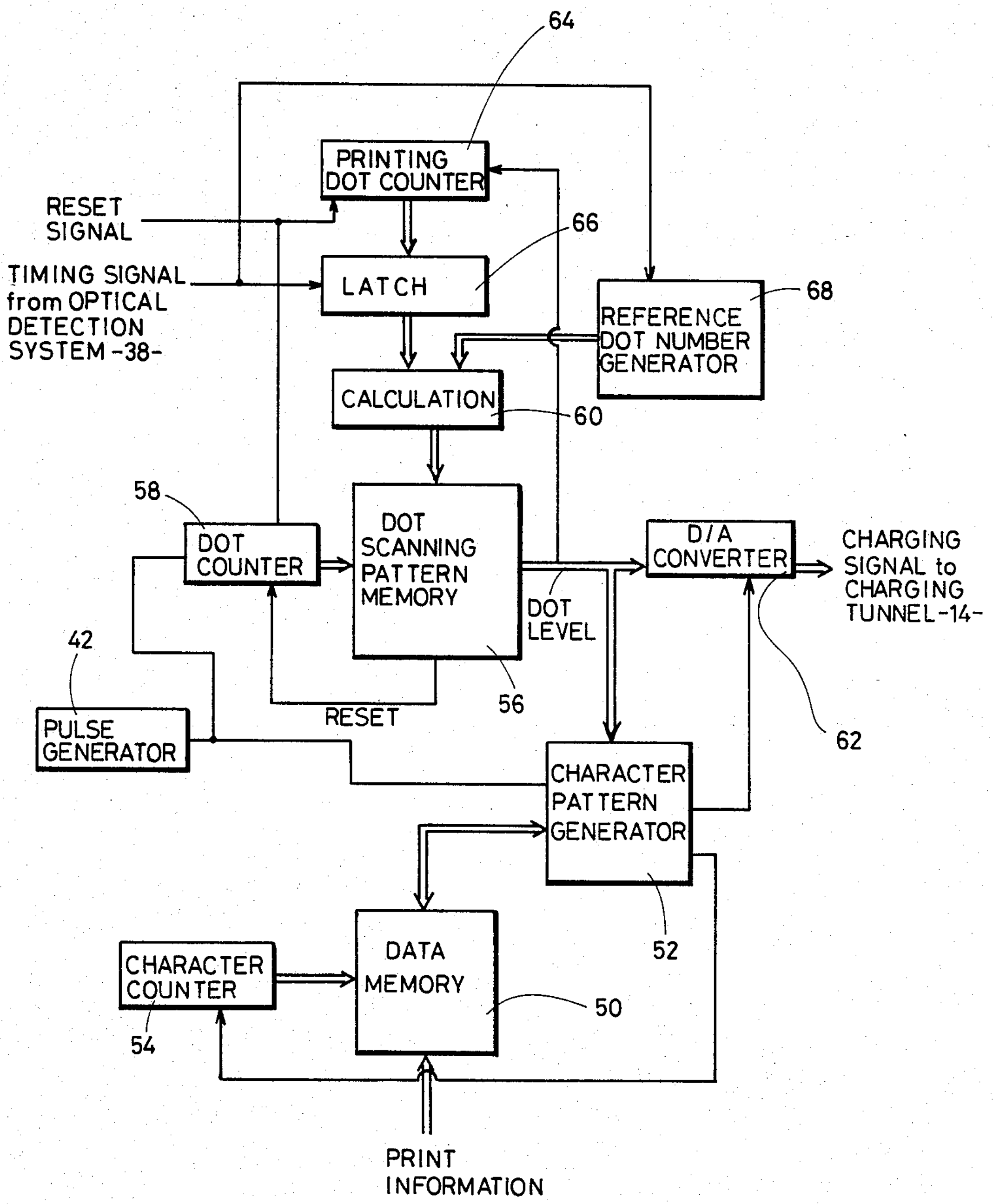
FIG. 3 is a block diagram of a print control circuit included in the control circuit of FIG. 2.

FIG. 3 shows, in detail, the print control circuit 44 included in the ink jet system printer of the present invention. In this embodiment, one character is formed by a matrix pattern of 40×24 dot positions.

The above-mentioned print information signal such as a coded character data developed from, for example, a keyboard panel and a data processing system, is introduced into a data memory 50 and temporarily stored therein. The thus stored character data is sequentially applied to a character pattern generator 52 in response to a control signal developed from a character counter 54. The contents stored in the character counter 54 are increased by one when the character pattern generator 52 develops the character pattern data of one character. That is, the character counter 54 counts the number of characters being printed by the ink jet system printer.

The print control circuit 44 includes a dot scanning pattern memory 56 implemented with a read only memory. The dot scanning pattern memory 56 develops a dot level data signal in response to count contents stored in a dot counter 58 and a data signal developed from a calculation circuit 60. The dot counter 58 counts the pulse signal developed from the pulse generator 42. The data signal developed from the calculation circuit 60 represents the speed of the travelling carriage 10. An operational mode of the calculation circuit 60 will be described later in detail. The dot level data signal developed from the dot scanning pattern memory 56 is applied to the character pattern generator 52 and a digital to analog converter 62. The dot scanning pattern memory 56 further develops a pulse signal which represents the number of the ink droplets contributing to form the matrix pattern of 40×24 construction. The thus developed pulse signal is applied to a printing dot counter 64. That is, the printing dot counter 64 counts the dots which are assigned to one of the dot positions of the 40×24 matrix pattern. The dot scanning pattern memory 56 still further develops a reset signal to the dot counter 58 when the scanning operation of one character is completed. The dot level data signal developed from the dot scanning pattern memory 56 functions to determine the charge level to be applied to the charging tunnel 14. More specifically, in one column of the 40×24 dot matrix pattern, each dot position is varied in level from the lowest level "1" to the highest level "40". Furthermore, the interpolation level "0" is provided, wherein the "0" level dot is directed to the beam gutter 18.

A latch circuit 66 is connected to the printing dot counter 64. When the timing signal is developed from the optical detection system 38, the latch circuit 66 introduces and presets therein the count contents stored in the printing dot counter 64. The thus introduced count contents are applied to the calculation circuit 60. A reference dot number generation circuit 68 is provided for developing the total value of the reference dot number when the timing signal is developed from the optical detection system 38. More specifically, when the timing signal indicating the second character position is developed from the optical detection system 38, the reference dot number generation circuit 68 develops the number "960" (=40×24). When the timing signal indicating the third character position is developed from the optical detection system 38, the reference dot number generation circuit 68 develops the number "1920" (=960+960). When the timing signal indicating the fourth character position is developed from the optical detection system 38, the reference dot number generation circuit 68 develops the number "2880" (=1920+960). When the timing signal indicating the n-th character position is developed from the optical detection system 38, the reference dot number generation circuit 68 develops the number "960×(n−1)". The thus developed reference dot number is applied to the calculation circuit 60.

The calculation circuit 60 functions to subtract the printing dot number applied from the latch circuit 66 from the reference dot number applied from the reference dot number generation circuit 68. The subtraction result, which indicates the travelling speed condition of the carriage 10, is applied to the dot scanning pattern memory 56. In response to the thus introduced subtraction result, the dot scanning pattern memory 56 determines the number of the interpolation dots ("0" level) which should be included in the ink droplets emitted from the nozzle 12.

Figure 4:
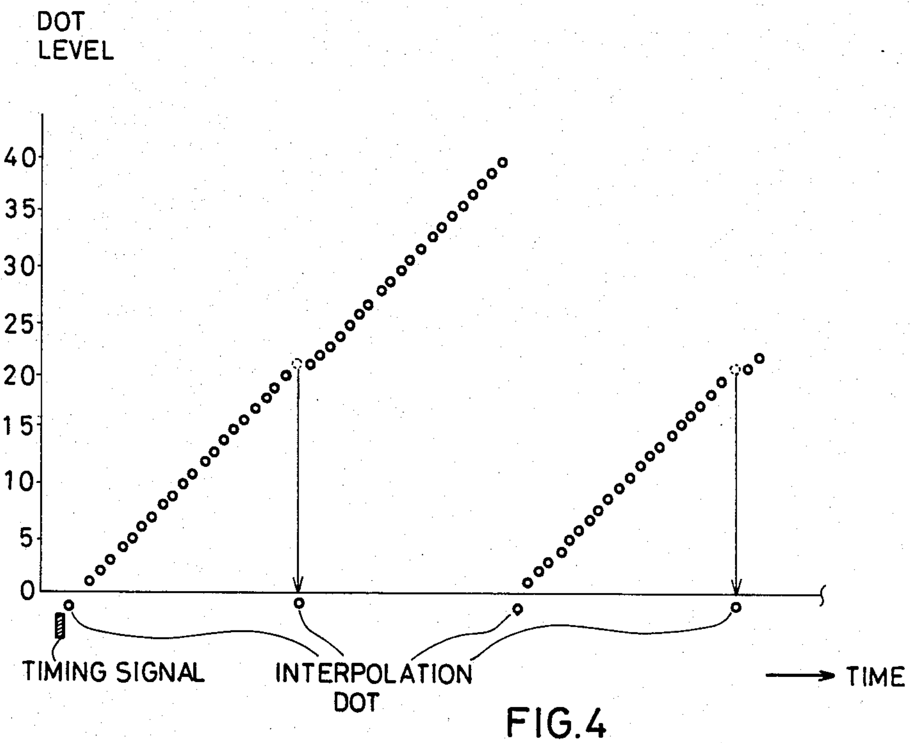
FIGS. 4 and 5 are charts for explaining operational modes of the print control circuit of FIG. 3.
Figure 5:
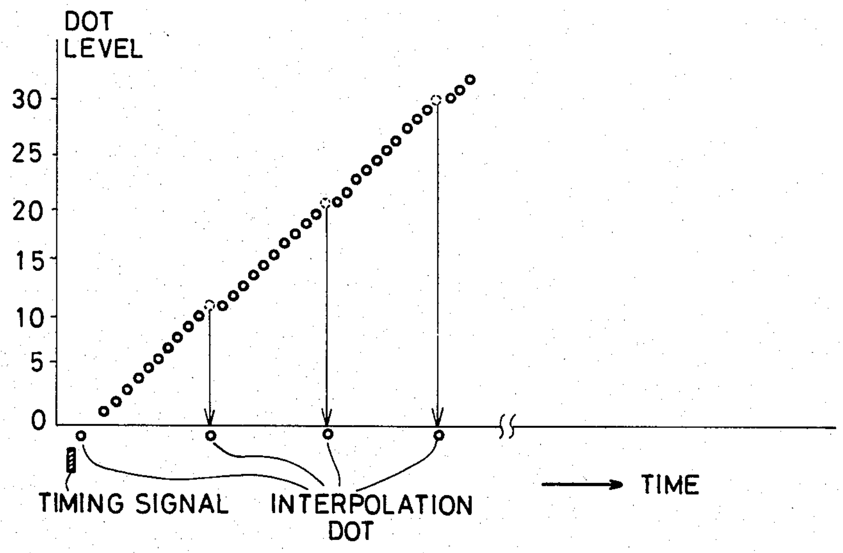

FIGS. 4 and 5 show operational conditions of the ink jet system printer of the present invention, wherein a desired number of interpolation dots are included in the ink droplets emitted from the nozzle 12.

When the carriage 10 travels at a reference speed, the interpolation dots are provided at the ratio of 1/20 as shown in FIG. 4. When the carriage speed is slower than the reference speed, the interspersed interpolation dots should be increased in number as shown in FIG. 5, wherein the ratio is 1/10. When the carriage speed is higher than the reference speed, the number of interpolation dots should be reduced to conduct the stable operation. In the normal operational mode, wherein the interpolation dot is provided at the ratio of 1/20 as shown in FIG. 4, the pulse generator 42 develops 1008 pulses between the adjacent two timing signals developed from the optical detection system 38. In this normal operational mode, the printing dot number developed from the dot scanning pattern memory 56 during the one character printing is "960", and the interpolation dot number during the one character printing is "48". The interpolation dot number, for example, "48" is changed by the dot scanning pattern memory 56 in response to the subtraction result applied from the calculation circuit 60.

The character pattern generator 52 selects a desired pattern in response to the character code applied from the data memory 50. In combination with the dot level signal developed from the dot scanning pattern memory 56, desired dots in one column are selected, and the respective column is selected by counting the pulse signal developed from the pulse generator 42. That is, the character pattern generator 52 develops a control signal indicating whether a dot is the actual printing dot or not. When the dot is the actual printing dot, the digital to analog converter 62 develops a charging signal of the corresponding voltage level to the charging tunnel 12.

An operational mode of the ink jet system printer of the present invention is as follows:

When the carriage 10 is located at the home position, the printing dot counter 64 and the dot counter 58 are reset to the initial states by the reset signal. As the carriage 10 travels, and when the carriage 10 reaches the first character position, the dot scanning pattern memory 56 develops the dot level signal with the interpolation level of the reference ratio 1/20. A desired character pattern is printed on the record receiving paper 32 in accordance with the first character data applied from the data memory 50. While the printing operation is conducted, the printing dot counter 64 counts the dot number assigned to the matrix pattern. When the one character printing is completed, the one character print completion signal is developed from the character pattern generator 52 to the character counter 54. Then the second character printing operation is carried out.

When the carriage 10 reaches the second character position, the optical detection system 38 develops the timing signal. The printing dot number counted by the printing dot counter 64 is introduced into the latch circuit 66 and temporarily stored in the latch circuit 66. The timing signal is also applied to the reference dot number generation circuit 68 to develop the reference dot number "960" to the calculation circuit 68. That is, the calculation circuit 60 receives the reference dot number "960" developed from the reference dot number generation circuit 68 and the printing dot number counted by the printing dot counter 64 and stored in the latch circuit 66.

When the actual carriage speed is identical with the reference speed, the printing dot number stored in the latch circuit 66 is "960". Therefore, the subtraction result obtained at the calculation circuit 60 is "0". The dot scanning pattern memory 56 does not change the interpolation dot ratio from 1/20 as shown in FIG. 4.

When the actual carriage speed is lower than the reference speed, the printing dot number counted by the printing dot counter 64 and stored in the latch circuit 66 is greater than "960". Therefore, the calculation circuit 60 develops a calculation result of a negative value. In response to the thus obtained calculation result of the negative value, the dot scanning pattern memory 56 functions to increase the interpolation dots as shown in FIG. 5.

When the actual carriage speed is higher than the reference speed, the printing dot number stored in the latch circuit 66 is less than the reference number "960". The calculation circuit 60 develops a calculation result of a positive value. In response to the positive calculation result, the dot scanning pattern memory 56 functions to reduce the interpolation dots.

In this way, the interpolation dot ratio is determined upon every completion of one character printing operation. In a preferred form, the dot scanning pattern memory 56 stores several dot level patterns of different interpolation dot ratios. For example, the dot scanning pattern memory 56 stores five dot level patterns, wherein the interpolation dot ratio is 1/40, 1/30, 1/20, 1/10, and 1/5. One of these patterns is selected in accordance with the calculation result developed from the calculation circuit 60.

In the above-mentioned embodiment, the first character is printed by the reference dot level pattern, wherein the interpolation dot ratio is 1/20. In another embodiment, a training period can be provided before conducting the first character printing operation. Furthermore, the timing signal is not necessarily required for each character position. The timing signal can be developed upon every completion of the printing operation of a predetermined number of characters.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink jet system printer of the charge amplitude controlling type comprising:

means for emitting printing ink droplets, said printing ink droplets including primary matrix dots and interpolation ink droplets not assigned to primary dots and being developed between adjacent primary matrix dots;

a record receiving member disposed in front of said printer head and selectively receiving said primary matrix dots, said interpolation ink droplets not being applied to said record receiving member;

shift means for shifting said means for emitting printing ink droplets in the lateral direction with respect to said record receiving member;

detection means for developing a timing signal each time said means for emitting printing ink droplets travels a predetermined length in said lateral direction;

counter means for counting said printing ink droplets emitted from said means for emitting printing ink droplets between adjacent timing signals developed from said detection means;

reference number generation means for developing a reference dot number representative of a reference number of droplets between adjacent timing signals in response to said timing signal developed from said detection means;

comparing means for comparing the count number counted by said counter means with said reference dot number developed from said reference number generation means; and print control means for varying the ratio of said interpolation ink droplets with respect to said primary matrix dots in response to a comparison result developed from said comparing means so as to maintain the density of said primary matrix dots substantially constant.

2. The ink jet system printer of the charge amplitude controlling type of claim 1, wherein the ink jet system printer prints characters, each character being formed in a dot matrix pattern having $n \times m$ dot positions.

3. The ink jet system printer of the charge amplitude controlling type of claim 2, further comprising a beam gutter disposed between said printer head and said record receiving member.

4. The ink jet system printer of the charge amplitude controlling type of claim 3, wherein:

said primary matrix dots are assigned to one of said dot positions included in said dot matrix pattern;

said interpolation ink droplets are directed to said beam gutter; and said interpolation ink droplets are interposed among said printing ink droplets at a desired ratio.

5. The ink jet system printer of the charge amplitude controlling type of claim 4, wherein said detection means develops said timing signal when said printer head reaches a character printing position.

6. The ink jet system printer of the charge amplitude controlling type of claim 5, wherein said detection means comprises:

a slit plate disposed along a travelling course of said printer head, said slit plate having a plurality of slits formed at each character printing position; and an optical detection system mounted on said printer head for detecting said slits formed in said slit plate.

7. In an ink jet printer having a means for emitting printing ink droplets mounted on a carriage translatable across a print receiving medium for formation of images thereon, a method of maintaining the print density of said images substantially constant despite undesired variations in the translation speed of said carriage comprising:

developing said printing ink droplets with said means for emitting, said developed printing ink droplets including primary matrix dots selectively applied to said print receiving medium and interpolation ink droplets not assigned to primary dots, being developed between adjacent primary matrix dots and not being applied to said record receiving member;

developing a timing signal each time said means for emitting printing ink droplets translates a predetermined distance along said print receiving medium;

counting said printing ink droplets emitted between adjacent timing signals;

developing a reference dot number representative of a reference number of droplets between adjacent timing signals;

comparing the counted number of droplets emitted between adjacent timing signals to said reference dot number to develop a difference signal; and controlling said means for emitting printing ink droplets in response to said difference signal to vary the ratio of said interpolation ink droplets to said primary matrix dots so as to maintain the density of said primary matrix dots substantially constant.

* * * * *